United States Patent
Zou et al.

(10) Patent No.: US 11,085,859 B1
(45) Date of Patent: Aug. 10, 2021

(54) EXPERIMENTAL SYSTEM AND METHOD FOR SIMULATING EFFECT OF FAULT STICK-SLIP DISPLACEMENT ON TUNNEL ENGINEERING

(71) Applicant: INSTITUTE OF GEOLOGY AND GEOPHYSICS, CHINESE ACADEMY OF SCIENCES, Beijing (CN)

(72) Inventors: Yu Zou, Beijing (CN); Guangming Luo, Beijing (CN); Bowen Zheng, Beijing (CN); Shengwen Qi, Beijing (CN); Hui Zhou, Beijing (CN); Manchao He, Beijing (CN)

(73) Assignee: INSTITUTE OF GEOLOGY AND GEOPHYSICS, CHINESE ACADEMY OF SCIENCES, Beijing (CN)

( * ) Notice: Subject to any disclaimer, the term of this patent is extended or adjusted under 35 U.S.C. 154(b) by 0 days.

(21) Appl. No.: 17/226,116

(22) Filed: Apr. 9, 2021

(30) Foreign Application Priority Data

Jan. 14, 2021 (CN) .......................... 202110049130.4

(51) Int. Cl.
*G01N 3/08* (2006.01)
*E21F 17/00* (2006.01)

(52) U.S. Cl.
CPC .............. *G01N 3/08* (2013.01); *E21F 17/00* (2013.01)

(58) Field of Classification Search
CPC ...... G01N 3/30; G01N 33/24; G01N 15/0806; G01N 3/22; G01N 2203/0048; G01N 3/02; G05B 19/0423
See application file for complete search history.

(56) References Cited

U.S. PATENT DOCUMENTS

2017/0284911 A1* 10/2017 Nl .............................. G01N 3/10
2019/0383714 A1* 12/2019 Li ......................... G01M 99/007

FOREIGN PATENT DOCUMENTS

| CN | 105785468 A | 7/2016 |
| CN | 106198191 A | 12/2016 |
| CN | 109211690 A | 1/2019 |
| CN | 209878493 U | 12/2019 |
| CN | 110780056 A | 2/2020 |
| CN | 210269423 U | 4/2020 |

(Continued)

*Primary Examiner* — Brandi N Hopkins
(74) *Attorney, Agent, or Firm* — Bayramoglu Law Offices LLC

(57) ABSTRACT

An experimental system for simulating the effect of a fault stick-slip displacement on a tunnel engineering includes a model box system and a stick-slip loading system. The model box system is configured to simulate an interaction between two walls of a fault. The stick-slip loading system includes a first loading assembly, a second loading assembly and a bearing assembly. The first loading assembly includes a first loading device, and a first sample frame configured to place a main loading rock mass sample. The bearing assembly is arranged on two sides of the first sample frame. Sub-loading rock mass samples borne by the bearing assembly are configured to abut against the main loading rock mass sample under the action of the second loading assembly. A method for simulating the effect of a fault stick-slip displacement on a tunnel engineering based on the above system is further provided.

14 Claims, 3 Drawing Sheets

(56) References Cited

FOREIGN PATENT DOCUMENTS

| | | | |
|---|---|---|---|
| CN | 111158067 | A | 5/2020 |
| CN | 111982708 | A | 11/2020 |
| CN | 112113816 | A | 12/2020 |
| JP | 2003294601 | A | 10/2003 |

\* cited by examiner

EXPERIMENTAL SYSTEM AND METHOD FOR SIMULATING EFFECT OF FAULT STICK-SLIP DISPLACEMENT ON TUNNEL ENGINEERING

CROSS REFERENCE TO THE RELATED APPLICATIONS

This application is based upon and claims priority to Chinese Patent Application No. CN 202110049130.4, filed on Jan. 14, 2021, the entire contents of which are incorporated herein by reference.

TECHNICAL FIELD

The present invention belongs to the technical field of geomechanics experiments of rock mass engineering, and more particularly, to an experimental system and method for simulating the effect of a fault stick-slip displacement on a tunnel engineering.

BACKGROUND

When engineering and constructing in active tectonic regions, stability problems of tunnels crossing active faults often occur. It is, therefore, urgent to thoroughly evaluate the effect of active fault displacement on tunnel engineering and current evaluation methods have shortcomings. Existing studies focus on physical simulation through a model box by loading a stable displacement and there is a lack of a loading device and method for fault stick-slip displacement. The existing patent discloses an experimental device for simulating a near-fault ground motion caused by a reverse fault stick-slip displacement. On one hand, a pressure-sensitive micro-explosive device is used to simulate the pulse-type ground motion induced by the fault stick-slip displacement. This method, however, is complicated, costly, unstable during the experiment, and has potential safety hazards. Meanwhile, since the explosion wave differs from the seismic wave in terms of seismic phase and primary (P) wave onset, the micro-explosive device cannot properly simulate the effect of the natural seismic wave. On the other hand, a loading device directly acts on a hanging wall or a foot wall to generate a shear slip between the hanging wall and the foot wall. This pure artificial loading manner results in a large difference with the actual seismic wave regarding near-fault pulse-type ground motions, and it is thus difficult to acquire reliable experimental reference data for actual tunnel construction.

SUMMARY

In order to solve the problem that the prior experimental device cannot acquire reliable data, the present invention provides an experimental system and method for simulating the effect of a fault stick-slip displacement on a tunnel engineering.

A first aspect of the present invention provides an experimental system for simulating the effect of a fault stick-slip displacement on a tunnel engineering. The experimental system includes a model box system and a stick-slip loading system. The model box system is configured to simulate an interaction between two walls of a fault. The stick-slip loading system includes a first loading assembly, a second loading assembly and a bearing assembly. The first loading assembly includes a first loading device and a first sample frame arranged at a preset position of the first loading device. The first sample frame is configured to place a main loading rock mass sample. The bearing assembly is arranged on two sides of the first sample frame. Sub-loading rock mass samples borne by the bearing assembly are configured to abut against the main loading rock mass sample under an action of the second loading assembly. During an experiment, the second loading assembly provides a horizontal loading force for the main loading rock mass sample through the sub-loading rock mass samples. The main loading rock mass sample is configured to provide a vertical loading force for a first wall under an action of the first loading device. Alternatively, the main loading rock mass sample is configured to provide a vertical loading force for a second wall under the action of the first loading device. Alternatively, the main loading rock mass sample is configured to provide a horizontal loading force for the first wall under the action of the first loading device.

In some preferred embodiments, the bearing assembly includes a first bearing device and a second bearing device, which are arranged on the two sides of the first sample frame, respectively. The sub-loading rock mass samples include a first sub-loading rock mass sample and a second sub-loading rock mass sample, which are placed in the first bearing device and the second bearing device, respectively. The second loading assembly includes a first horizontal loading device and a second horizontal loading device, which are arranged oppositely. The first sub-loading rock mass sample and the second sub-loading rock mass sample clamp the main loading rock mass sample under an action of the first horizontal loading device and an action of the second horizontal loading device, respectively.

In some preferred embodiments, the model box system includes an open and hollow box structure. The box structure includes a first box and a second box, which are arranged horizontally. The first box includes a first front panel, a first rear panel, a first side panel and a first bottom panel. The second box includes a second front panel, a second rear panel, a second side panel and a second bottom panel. The first side panel and the second side panel are arranged oppositely. An oblique contact surface is formed between the first box and the second box. The first box and the second box are arranged horizontally on the left and right. The first wall is arranged between the side of the second box away from the second side panel and the inner surface of the first box, and the second wall is arranged between the side of the first box away from the first side panel and the inner surface of the second box.

In some preferred embodiments, the stick-slip loading system is arranged under the first box. The second box is fixed on the ground by a supporting device. The first wall is a hanging wall, and the second wall is a foot wall. The first sample frame is arranged on the top of the first loading device. A guide rail device is arranged on the top of the first sample frame. An extending direction of the guide rail device is identical to a moving direction of the second loading assembly. A groove structure adapted to the guide rail device is formed on the bottom of the first bottom panel.

In some preferred embodiments, the stick-slip loading system is arranged under the second box. The first box is fixed on the ground by a supporting device. The first wall is a hanging wall, and the second wall is a foot wall. The first sample frame is arranged on the top of the first loading device. A guide rail device is arranged on the top of the first sample frame. An extending direction of the guide rail device is identical to a moving direction of the second loading assembly. A groove structure adapted to the guide rail device is formed on the bottom of the second bottom panel.

In some preferred embodiments, the stick-slip loading system is arranged on a side of the first box, and the stick-slip loading system and the first box are arranged horizontally. The second box is fixed on the ground. The first wall and the second wall are two walls of a strike-slip fault, respectively. The first sample frame is arranged on a side of the first loading device. A guide rail device is arranged on the side of the first sample frame away from the first loading device. An extending direction of the guide rail device is identical to a moving direction of the second loading assembly. A groove structure adapted to the guide rail device is formed on a side of the first front panel.

In some preferred embodiments, the stick-slip loading system further includes a first loading plate and a second loading plate. The first loading plate and the second loading plate are arranged on a movable end of the first horizontal loading device and a movable end of the second horizontal loading device, respectively. A size of the first loading plate and a size of the second loading plate are adapted to a side area of the first sub-loading rock mass sample and a side area of the second sub-loading rock mass sample, respectively. A roller assembly is further arranged on the bottom of the first bottom panel. The roller assembly includes a plurality of rollers, and the plurality of rollers are arranged in an array.

In some preferred embodiments, the thickness of the main loading rock mass sample is greater than the width of the first sample frame. The thickness of the first sub-loading rock mass sample is greater than the width of the first bearing device. The thickness of the second sub-loading rock mass sample is greater than the width of the second bearing device.

In some preferred embodiments, the stick-slip loading system further includes a loading system frame. The loading system frame includes a first side plate, a second side plate, a third side plate and a bottom plate. The first side plate and the second side plate are configured to fix the first horizontal loading device and the second horizontal loading device, respectively. Each of the first side plate and the second side plate is an inverted L-shaped steel plate, and the short edge of the inverted L-shaped steel plate abuts against the model box system.

A second aspect of the present invention provides an experimental method for simulating an effect of a fault stick-slip displacement on a tunnel engineering, and the experimental method is based on any of the aforementioned experimental systems for simulating the effect of the fault stick-slip displacement on the tunnel engineering. The experimental method includes the following steps.

Step S100: placing the main loading rock mass sample and the sub-loading rock mass samples into the first sample frame and the bearing assembly, respectively; adjusting positions of the rock mass samples to enable the rock mass samples on both sides to tightly contact the middle rock mass sample; adjusting the second loading assembly to apply a desired pressure to the sub-loading rock mass samples. A contact surface between each of the sub-loading rock mass samples and the main loading rock mass sample is a rock mass discontinuity.

Step S200: assembling the model box system based on the arranged stick-slip loading system. When the normal fault displacement or the reverse fault displacement is simulated, the model box system is arranged above the stick-slip loading system. The stick-slip loading system provides a vertical loading force for the model box system to displace, and the stick-slip loading system is fixed on the ground. When the strike-slip fault displacement is simulated, the model box system and the stick-slip loading system are placed horizontally back and forth. The stick-slip loading system is fixed on the ground. The first box in the model box system is moved by pulleys on a bottom, and the second box is fixed on the ground.

Step S300: according to experimental requirements, preparing a model of a tunnel structure and a model of a lining inside the tunnel structure, and arranging a detection device; selecting a similar material with a suitable ratio to simulate a surrounding rock; layering the material in a model box, and placing the prepared model of the tunnel structure at a half-height position.

Step S400: pushing the first sample frame of the main loading rock mass sample by the first loading device to enable the main loading rock mass sample to rub against the sub-loading rock mass samples to produce the stick-slip effect. Since the first sample frame is in contact with the movable box in the model box system, the stick-slip effect is transmitted to the movable box. The movable box moves along a preset inclined plane under the limitation of a preset linear slide rail to enable a rock and soil in the model box to displace, so as to simulate the effect of a fault displacement on the tunnel structure. During the experiment, the deformation of the rock and soil is observed in real time through a transparent box, and experimental data is acquired through an arranged monitoring sensor.

Step S500: stopping the first loading device when a preset displacement is reached; removing the overlying similar material to take out the tunnel model; resetting the first loading device, and releasing the second loading device; taking out the rock mass samples, and finishing the experiment.

The present invention has the following advantages. (1) The present invention proposes a new seismic source simulation system based on a shear stick-slip effect of rock mass discontinuities to realize the simulation of near-fault pulse-type ground motions. The present invention can acquire high-precision and high-reliability experimental data regarding the effect of a fault stick-slip displacement on a tunnel engineering, which has important reference significance for the construction of tunnels crossing active faults.

(2) In an experimental system for simulating the effect of a fault stick-slip displacement on a tunnel engineering according to the present invention, a model box system and a stick-slip loading system are placed horizontally back and forth to effectively simulate a strike-slip fault displacement, so as to acquire experimental data regarding the effect of the strike-slip fault displacement on the tunnel engineering. The model box system and the stick-slip loading system are placed vertically up and down to effectively simulate a normal or reverse fault displacement, so as to acquire experimental data regarding the effect of the normal or reverse fault displacement on the tunnel engineering. The present invention can realize different forms of fault displacements, such as strike-slip displacement, normal and reverse fault displacements, by using model boxes with various sizes.

(3) When a rock mass undergoes a rapid fault displacement, a tectonic earthquake occurs due to the sudden release of accumulated stress. The relative horizontal and vertical motions of the rock masses on both sides of the displacement propagate to the overlying rock and soil to damage a tunnel structure therein. Based on the stick-slip effect of the shear displacement of the rock mass discontinuities, the present invention truly reflects the characteristic of the near-fault ground motion generated by the stick-slip displacement of the active fault and its effect on the tunnel structure.

(4) The present invention uses jacks as loading devices, which do not require an additional hydraulic servo power source and are simple for loading, thereby greatly reducing the costs.

(5) In the present invention, the rock mass samples can be flexibly replaced according to geological conditions of different regions. By replacing the samples with different lithological characteristics and discontinuity characteristics, the present invention achieves corresponding various stick-slip displacements, and acquires reliable experimental reference data for tunnel construction in different regions.

BRIEF DESCRIPTION OF THE DRAWINGS

Other features, objectives and advantages of the present invention will become more apparent upon reading the detailed description of the non-restrictive embodiments with reference to the following drawings.

Figure 1:
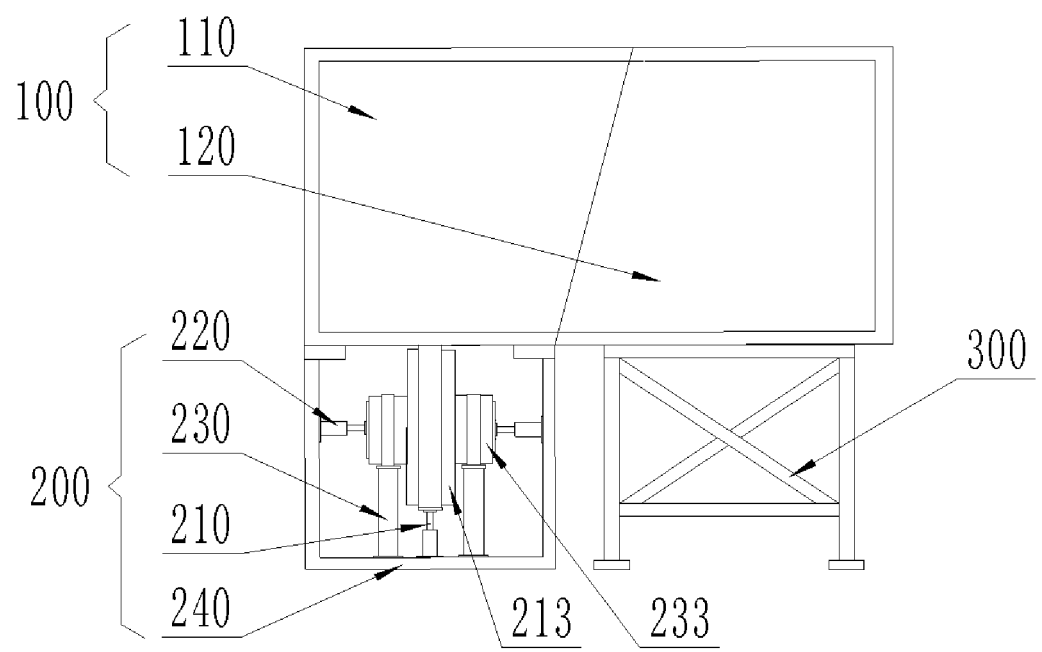
FIG. 1 is a front view of an experimental system for simulating the effect of a fault stick-slip displacement on a tunnel engineering when simulating a reverse fault displacement according to an embodiment of the present invention.

In the figures: 100. model box system; 110. first box; 120. second box; 200. stick-slip loading system; 210. first loading assembly; 211. first loading device; 212. first sample frame; 213. main loading rock mass sample; 214. guide rail device; 220. second loading assembly; 221. first horizontal loading device; 222. second horizontal loading device; 223. first loading plate; 224. second loading plate; 230. bearing assembly; 231. first bearing device; 232. second bearing device; 240. loading system frame; 241. first side plate; 242. second side plate; 243. third side plate; 244. bottom plate; 300. supporting device.

DETAILED DESCRIPTION OF THE EMBODIMENTS

In order to make the embodiments, technical solutions and advantages of the present invention clearer, the technical solutions of the present invention are clearly and completely described below with reference to the drawings. Obviously, the described embodiments are a part of the embodiments, rather than all of the embodiments. Those skilled in the art should understand that the implementations herein are merely intended to explain the technical principles of the present invention, rather than to limit the scope of protection of the present invention.

A first aspect of the present invention provides an experimental system for simulating the effect of a fault stick-slip displacement on a tunnel engineering. The experimental system includes a model box system and a stick-slip loading system. The model box system is configured to simulate an interaction between a first wall and a second wall, that is, to simulate an interaction between a hanging wall and a foot wall of a normal or reverse fault or an interaction between two walls of a strike-slip fault. The model box system includes an open and hollow box structure. The box structure includes a first box and a second box that are arranged horizontally. The first box includes a first front panel, a first rear panel, a first side panel and a first bottom panel. The second box includes a second front panel, a second rear panel, a second side panel and a second bottom panel. The first side panel and the second side panel are arranged oppositely. An oblique contact surface is formed between the first box and the second box. The first box and the second box are arranged horizontally on the left and right. The first wall is arranged between the side of the second box away from the second side panel and the inner surface of the first box, and the second wall is arranged between the side of the first box away from the first side panel and the inner surface of the second box. That is, the box structure is divided into a left half box and a right half box, which are combined into a hollow model box with a top opening to receive similar materials of a surrounding rock mass and a tunnel engineering.

The stick-slip loading system includes a first loading assembly, a second loading assembly and a bearing assembly. The first loading assembly includes a first loading device and a first sample frame arranged at a preset position of the first loading device. The first sample frame is configured to place a main loading rock mass sample. The bearing assembly includes a first bearing device and a second bearing device, which are arranged on two sides of the first sample frame, respectively. The first bearing device and the second bearing device are configured to place a first sub-loading rock mass sample and a second sub-loading rock mass sample, respectively. The second loading device includes a first horizontal loading device and a second horizontal loading device, which are configured to horizontally load the first sub-loading rock mass sample and the second sub-loading rock mass sample, respectively. Each of the first sub-loading rock mass sample and the second sub-loading rock mass sample is in contact with the main loading rock mass sample. A contact surface between the main loading rock mass sample and each of the first sub-loading rock mass sample and the second sub-loading rock mass sample is a rock mass discontinuity.

During an experiment, the second loading assembly provides a horizontal loading force for the main loading rock mass sample through the sub-loading rock mass samples. The main loading rock mass sample provides a vertical loading force for the hanging wall under the action of the first loading device to simulate a seismic source for a reverse fault displacement. Alternatively, the main loading rock mass sample provides a vertical loading force for the foot wall under the action of the first loading device to simulate a seismic source for a normal fault displacement. Alternatively, the main loading rock mass sample may provide a horizontal loading force for the first wall (i.e., a wall of the strike-slip fault) under the action of the first loading device to simulate a seismic source for a strike-slip fault displacement.

Further, the preset position refers to a movable end of the first loading device. When the stick-slip loading system is arranged under the first box, the second box is fixed, and a vertical loading force is provided for the first box through the first loading device to simulate a reverse fault displacement. When the stick-slip loading system is arranged under the second box, the first box is fixed, and a vertical loading force is provided for the second box through the first loading device to simulate a normal fault displacement. When the stick-slip loading system and the first box are arranged horizontally in the front and back, the second box is fixed, and a horizontal loading force is provided for the first box through the first loading device to simulate a strike-slip fault displacement.

The system of the present invention utilizes a shear stick-slip effect of the rock mass discontinuity, and utilizes the friction of two surfaces between three rock mass samples to form a double-shear stick-slip displacement. The specific implementation process is as follows. During the experiment, the first horizontal loading device and the second horizontal loading device act on the first sub-loading rock mass sample and the second sub-loading rock mass sample, respectively, so that the rock mass samples on both sides tightly contact the middle rock mass sample (i.e., the main loading rock mass sample). The first loading device pushes the rectangular sample frame of the middle rock mass sample, so that the middle rock mass sample rubs against the rock mass samples on both sides to produce a stick-slip effect. In this way, the present invention achieves the simulation of a near-fault pulse-type ground motion, so as to further study the effect of the active fault stick-slip displacement on the tunnel engineering. The stick-slip effect is transmitted to the movable box through a hinge device between the first sample frame and the movable box of the model box. The movable box moves along a preset inclined plane, causing the rock and soil in the model box to displace.

The present invention is further described in detail in conjunction with the drawings and specific embodiments.

Figure 2:
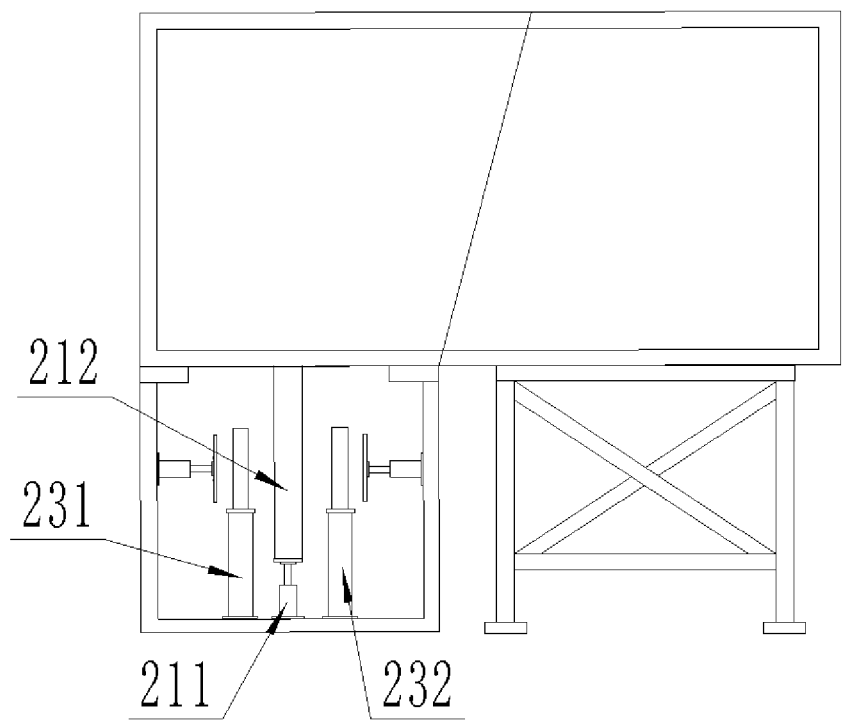
FIG. 2 is a front view of the structure without rock in FIG. 1.
Figure 3:
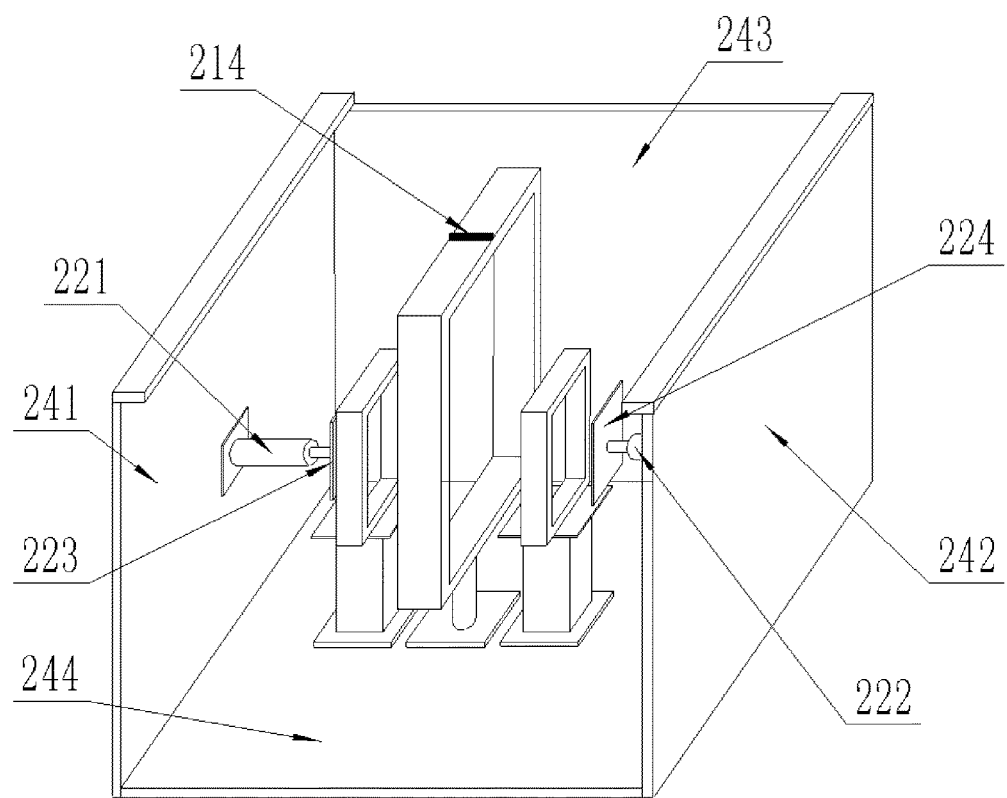
FIG. 3 is a schematic diagram of the three-dimensional structure of a stick-slip loading system of the experimental system for simulating the effect of the fault stick-slip displacement on the tunnel engineering when simulating the reverse fault displacement or a normal fault displacement according to an embodiment of the present invention.

Referring to FIGS. 1-3, FIG. 1 is a front view of an experimental system for simulating the effect of a fault stick-slip displacement on a tunnel engineering when simulating a reverse fault displacement according to an embodiment of the present invention. FIG. 2 is a front view of the structure without rock in FIG. 1. FIG. 3 is a schematic diagram of the three-dimensional structure of a stick-slip loading system of the experimental system for simulating the effect of the fault stick-slip displacement on the tunnel engineering when simulating a reverse fault displacement or a normal fault displacement according to an embodiment of the present invention. According to the present invention, an experimental system for simulating the effect of a fault stick-slip displacement on a tunnel engineering includes the model box system 100 and the stick-slip loading system 200. The model box system is configured to simulate an interaction between a hanging wall and a foot wall. The model box system includes an open and hollow box structure to receive similar materials of a surrounding rock mass and the tunnel engineering. The box structure includes the first box 110 and the second box 120 that are arranged horizontally. The first box includes a first front panel, a first rear panel, a first side panel and a first bottom panel. The second box includes a second front panel, a second rear panel, a second side panel and a second bottom panel. The first side panel and the second side panel are arranged oppositely. An oblique contact surface is formed between the first box and the second box. The first box and the second box are arranged horizontally on the left and right. A hanging wall is arranged between the side of the second box away from the second side panel and the inner surface of the first box, and the foot wall is arranged between the side of the first box away from the first side panel and the inner surface of the second box. The stick-slip loading system is arranged under the first box, and the second box is fixed on the ground through the supporting device 300. The stick-slip loading system includes the first loading assembly 210, the second loading assembly 220, the bearing assembly 230 and the loading system frame 240. The first loading assembly includes the first loading device 211 and the first sample frame 212 arranged at a preset position of the first loading device. The first sample frame is configured to place the main loading rock mass sample 213. The bearing assembly includes the first bearing device 231 and the second bearing device 232, which are arranged on both sides of the first sample frame, respectively. Sub-loading rock mass samples include a first sub-loading rock mass sample and a second sub-loading rock mass sample, which are placed in the first bearing device and the second bearing device, respectively. The second loading assembly includes a first horizontal loading device and a second horizontal loading device that are arranged oppositely. The first sub-loading rock mass sample and the second sub-loading rock mass sample clamp the main loading rock mass sample under the action of the first horizontal loading device and an action of the second horizontal loading device, respectively.

During an experiment, the second loading assembly provides a horizontal loading force for the main loading rock mass sample through the sub-loading rock mass samples, and the main loading rock mass sample provides a vertical loading force for the hanging wall under the action of the first loading device. In this way, a seismic source is effectively simulated by using the shear stick-slip effect of a rock mass discontinuity, so as to improve the reliability of the experimental data.

Further, the stick-slip loading system further includes the first loading plate 223 and the second loading plate 224. The first loading plate and the second loading plate are arranged on a movable end of the first horizontal loading device and a movable end of the second horizontal loading device, respectively. Areas of the first loading plate and the second loading plate are identical to side areas of the first sub-loading rock mass sample and the second sub-loading rock mass sample to achieve uniform loading.

Preferably, the thickness of the main loading rock mass sample is greater than the width of the first sample frame. The thickness of the first sub-loading rock mass sample is greater than the width of the first bearing device. The thickness of the second sub-loading rock mass sample is greater than the width of the second bearing device.

Further, the loading system frame includes the first side plate 241, the second side plate 242, the third side plate 243 and the bottom plate 244. The first side plate and the second side plate are configured to fix the first horizontal loading device 221 and the second horizontal loading device 222, respectively. Each of the first side plate and the second side plate is an inverted L-shaped steel plate, and the short edge of the inverted L-shaped steel plate abuts against the model box system. In an embodiment of the present invention, the short edge of the inverted L-shaped steel plate is located on the top of the loading system frame, and is in contact with the bottom panel of the first box.

Further, the guide rail device 214 is arranged on the top of the first sample frame. An extending direction of the guide rail device is identical to a moving direction of the second loading assembly. A groove structure adapted to the guide rail device is formed on the bottom of the first bottom panel. The guide rail device cooperates with the groove structure to limit the position of the first box and reduce the friction during the experiment.

Further, each of the first front panel, the first rear panel, the first side panel, the first bottom panel, the second front panel, the second rear panel, the second side panel and the second bottom panel has a steel frame on the periphery and a plexiglass at the middle, which is convenient for observing the materials inside the box in real time during the experiment.

Further, a contact portion between the first box and the second box denotes an inclined plane of a fault displacement surface, and an inclined angle of the inclined plane can be designed as needed. The plane is perpendicular to the first front panel and the second front panel, and, on this plane, three edges of the left half box are correspondingly in contact with three edges of the right half box.

Preferably, each of the first loading device, the first horizontal loading device and the second horizontal loading device is a jack, which can meet the loading requirements and reduce cost.

Preferably, the first bearing device and the second bearing device are steel columns, which are bolted to the bottom plate of the loading system frame.

Preferably, the rock mass samples required for the experiment are hard igneous rock such as granite and gabbro, which vary in shear stick-slip effects under the conditions of different lithological characteristics and different normal forces. In the present invention, the rock mass samples can be flexibly replaced according to geological conditions of different regions. By replacing the samples with different lithological characteristics and discontinuity characteristics, the present invention achieves corresponding various stick-slip displacements, and acquires reliable experimental reference data for tunnel construction in different regions.

Figure 4:
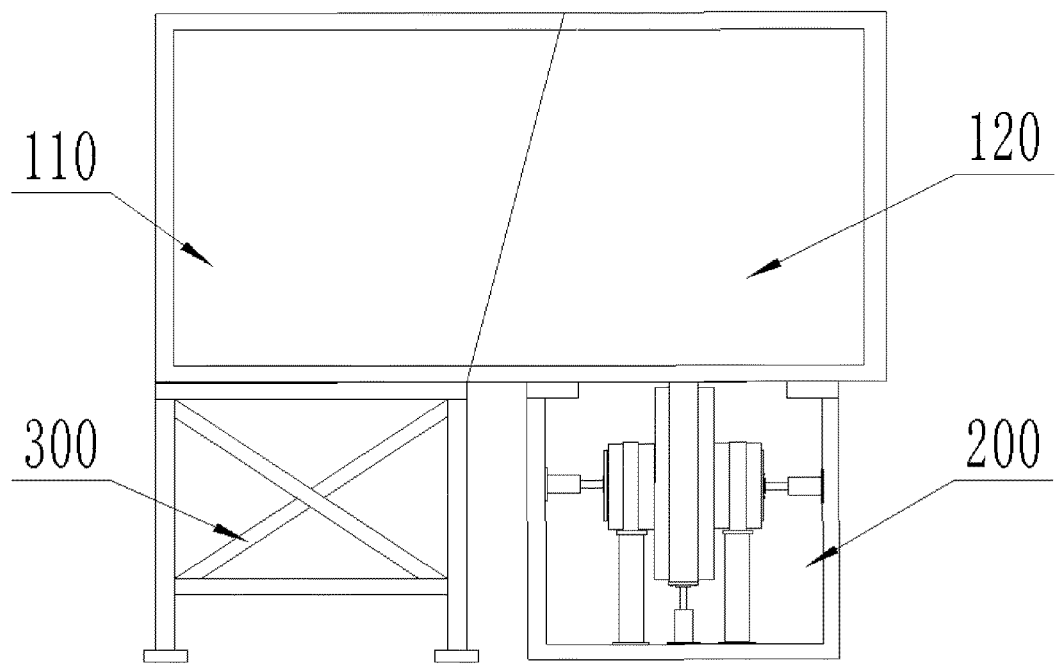
FIG. 4 is a front view of the experimental system for simulating the effect of the fault stick-slip displacement on the tunnel engineering when simulating the normal fault displacement according to an embodiment of the present invention.

Referring to FIG. 4, FIG. 4 is a front view of the experimental system for simulating the effect of the fault stick-slip displacement on the tunnel engineering when simulating a normal fault displacement according to an embodiment of the present invention. The stick-slip loading system 200 is arranged under the second box 120. The first box 110 is fixed on the ground through the supporting device 300. The first sample frame is arranged on the top of the first loading device.

Further, a guide rail device is arranged on the top of the first sample frame. An extending direction of the guide rail device is identical to a moving direction of the second loading assembly. A groove structure adapted to the guide rail device is formed on the bottom of the second bottom panel.

Figure 5:
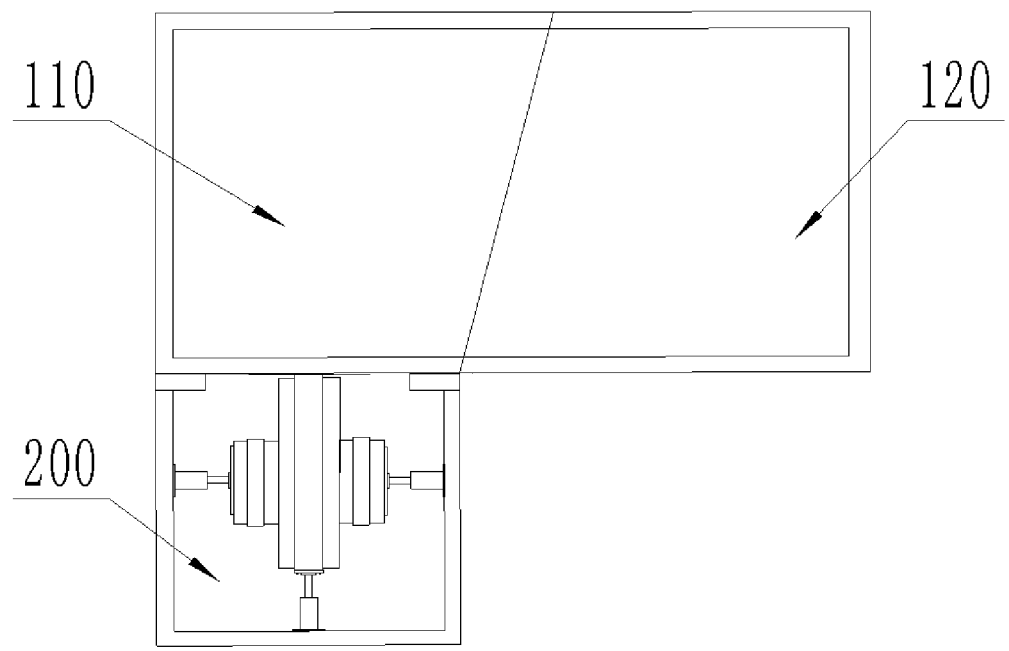
FIG. 5 is a top view of the experimental system for simulating the effect of the fault stick-slip displacement on the tunnel engineering when simulating a strike-slip fault displacement according to an embodiment of the present invention.
Figure 6:
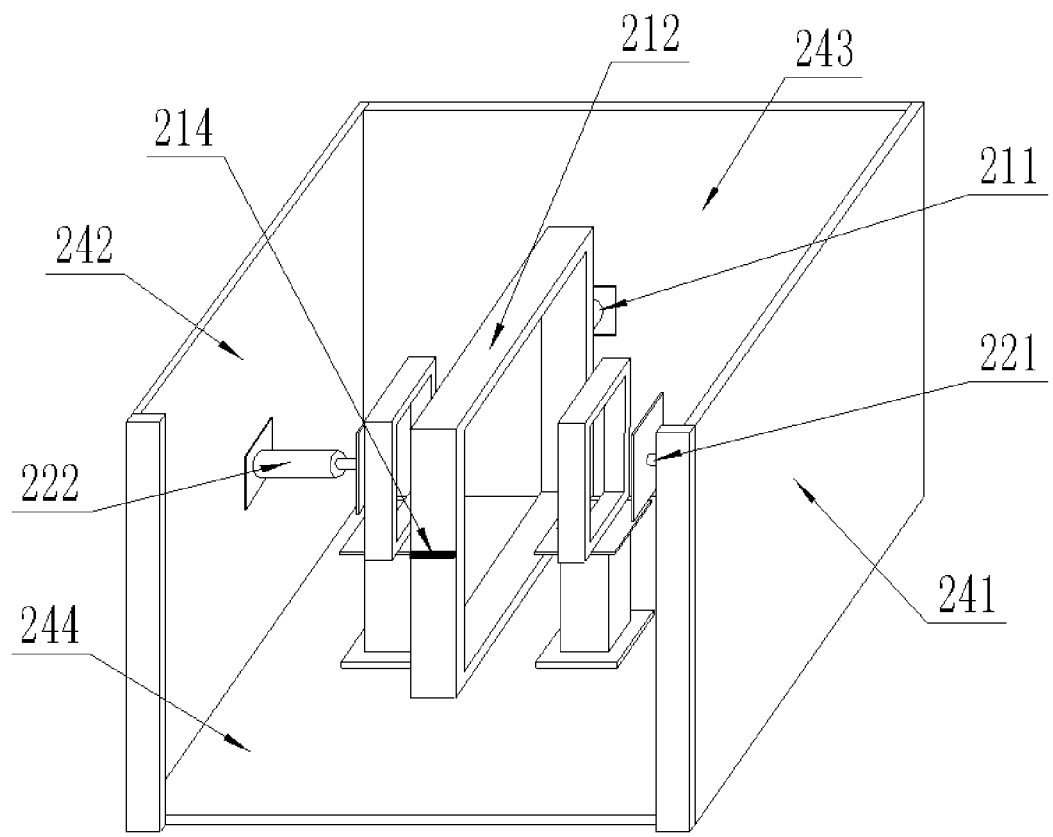
FIG. 6 is a schematic diagram of the three-dimensional structure of the stick-slip loading system of the experimental system for simulating the effect of the fault stick-slip displacement on the tunnel engineering when simulating the strike-slip fault displacement according to an embodiment of the present invention.

Referring to FIGS. 5 and 6, FIG. 5 is a top view of the experimental system for simulating the effect of the fault stick-slip displacement on the tunnel engineering when simulating a strike-slip fault displacement according to an embodiment of the present invention. FIG. 6 is a schematic diagram of the three-dimensional structure of the stick-slip loading system of the experimental system for simulating the effect of the fault stick-slip displacement on the tunnel engineering when simulating a strike-slip fault displacement according to an embodiment of the present invention. The stick-slip loading system 200 is arranged on a side of the first box 110, and the stick-slip loading system and the first box are arranged horizontally. The second box 120 is fixed on the ground. The first loading device provides a horizontal loading force for the model box system to displace. The first box and the second box are arranged horizontally on the left and right. A first wall is arranged between the side of the second box away from the second side panel and the inner surface of the first box, and a second wall is arranged between the side of the first box away from the first side panel and the inner surface of the second box. The first wall and the second wall are arranged on the left and right and are in contact with each other.

The first sample frame 212 is arranged on a side of the first loading device 211. The guide rail device 214 is arranged on the side of the first sample frame away from the first loading device. An extending direction of the guide rail device is identical to a moving direction of the second loading assembly. A groove structure adapted to the guide rail device is formed on a side of the first front panel. The loading system frame includes the first side plate 241, the second side plate 242, the third side plate 243 and the bottom plate 244. The first side plate and the second side plate are configured to fix the first horizontal loading device 221 and the second horizontal loading device 222, respectively. Each of the first side plate and the second side plate is an inverted L-shaped steel plate, and the short edge of the inverted L-shaped steel plate abuts against the model box system. In an embodiment of the present invention, the short edge of the inverted L-shaped steel plate is located on the movable end of the loading system frame, and is in contact with the bottom panel of the first box.

Further, a roller assembly is arranged on the bottom of the first bottom panel. The roller assembly includes a plurality of rollers, and the plurality of rollers are arranged in an array to reduce the friction with the ground.

The device of the present invention utilizes a shear stick-slip effect of the rock mass discontinuity, and utilizes the friction of two surfaces between three rock mass samples to form a double-shear stick-slip displacement. A second aspect of the present invention provides an experimental method for simulating the effect of a fault stick-slip displacement on a tunnel engineering. The experimental method includes the following steps.

Step 1: Rock mass samples are placed and loaded into the stick-slip loading system. The middle rock mass sample (i.e., the main loading rock mass sample) is first put into the rectangular sample frame (i.e., the first sample frame), and then the rock mass samples on both sides (i.e., the first sub-loading rock mass sample and the second sub-loading rock mass sample) are put into corresponding rectangular sample frames. The steel columns (i.e., the first bearing device and the second bearing device) fixedly connected to the sample frames are bolted to the bottom plate (in case of a normal or reverse fault) or rear plate (in case of a strike-slip fault) of the loading system frame. The positions of the rock mass samples are adjusted to enable the rock mass samples on both sides to tightly contact the middle rock mass sample, and the second loading assembly is adjusted to apply a desired pressure to the rock mass samples on both sides.

Step 2: The components of the experimental system are assembled according to experimental conditions. In case of the normal or reverse fault, the model box system and the stick-slip loading system are placed vertically up and down, and the stick-slip loading system provides a vertical loading force for the model box system to displace. The stick-slip loading system is fixed on the ground. The supporting device is fixed on the ground to support the model box. The difference between the implementations of the normal fault displacement simulation and the reverse fault displacement simulation only lies in the arrangement positions of the stick-slip loading system and a supporting frame. In case of the reverse fault, the short edges of the left and right L-shaped steel plates of the stick-slip loading system are in contact with the bottom panel of the first box, and the supporting device is fixedly connected to the second box. In case of the normal fault, the short edges of the left and right L-shaped steel plates of the stick-slip loading system are in contact with the bottom plate of the second box, and the supporting device is fixedly connected to the bottom panel of the first box. In case of the strike-slip fault, the model box system and the stick-slip loading system are placed horizontally back and forth, and the stick-slip loading system is fixed on the ground. The first box is moved by the pulleys on the bottom, and the second box is fixed on the ground. The short edges of the left and right L-shaped steel plates of the stick-slip loading system are in contact with the rear panel of the first box.

Step 3: A tunnel structure model is prepared, and a similar material of a surrounding rock is placed. Models of a tunnel structure and a lining inside the tunnel structure are prepared according to experimental requirements, and detection sensors such as strain gauges and soil pressure boxes are arranged according to specific requirements. A similar material with a suitable ratio is selected to simulate the surrounding rock, and the material is layered in the model box. The prepared tunnel structure model is placed at a half-height position. According to a simulated buried depth, a layer of heavy sand may be laid on the surface to increase the pressure at the buried depth.

Step 4: Experiment loading and monitoring are performed. The rectangular sample frame of the middle rock mass sample is pushed by the first loading device, so that the middle rock mass sample rubs against the rock mass samples on both sides to produce a stick-slip effect. Since the sample frame is in contact with the movable box of the model box, the stick-slip effect is transmitted to the movable box. The movable box moves along a preset inclined plane under the limitation of a linear slide rail, so that the rock and soil in the model box are displaced, so as to simulate the effect of a fault displacement on the tunnel structure. During the experiment, the deformation of the rock and soil is observed in real time through the plexiglass, and experimental data is acquired through the arranged monitoring sensors such as strain gauges and soil pressure boxes.

Step 5: The jack in the first loading device is stopped when a preset displacement is reached. The overlying similar material is removed to take out the tunnel model. The jack in the first loading assembly is reset, and the jack in the second loading device is released. The rock mass samples are taken out, and the experiment is finished.

According to the experimental requirements, the stick-slip effect may be improved by selecting the following means: increasing the load of the jack in the second loading device; employing tight rock mass samples with low porosity, few fragile minerals (such as calcite, dolomite, talcum and vermiculite) and hard texture; and removing debris and no filling in the discontinuity.

It should be noted that the sliding speed of an interface under the action of a constant traction force generally remains constant or approximately constant, but fluctuates greatly in some cases. If the friction or sliding speed fluctuates with a sliding distance or time, a so-called stick-slip phenomenon occurs. In a viscous stage, a static friction gradually increases to a certain value. Once an external force is sufficient to overcome this friction, the interface will slip. In the stick-slip process, the relationship between the friction and the time is a "sawtooth". Such a typical stick-slip effect can only occur when a static friction factor is significantly greater than a sliding friction factor. In a relatively deep part underground, the rocks on both sides of the fault must overcome the strong friction to slide. Therefore, usually the rocks of the two walls seem to stick to each other and no one can move, but when the stress accumulates to be greater than or equal to the friction, the rocks of the two walls slip suddenly. After the energy is released by the sudden sliding, the rocks of the two walls are stuck together again without moving, until the energy accumulates again to a certain degree to cause the next sudden sliding. The stick-slip loading system provided by the present invention can realize the highly reliable stick-slip simulation of the near-fault pulse-type ground motions, which cannot be realized by the prior arts.

It should be noted that in the description of the present invention, terms of indicating orientation or position relationships, such as "central", "upper", "lower", "left", "right", "vertical", "horizontal", "inner" and "outer" are based on orientation or position relationships shown in the drawings. They are merely intended to facilitate description, rather than to indicate or imply that the mentioned device or components must have a specific orientation or must be constructed and operated in a specific orientation. Therefore, these terms should not be construed as a limitation to the present invention. Moreover, the terms such as "first", "second" and "third" are used only for the purpose of description and are not intended to indicate or imply relative importance.

It should be noted that in the description of the present invention, unless otherwise clearly specified, meanings of terms "install", "connection" and "connect to" should be understood in a broad sense. For example, the "connection" may be a fixed connection, a detachable connection, or an integral connection; it may be a mechanical connection, or an electrical connection; it may be a direct connection, or an indirect connection through an intermediate medium; or it may be an internal connection between two components. Those skilled in the art should understand the specific meanings of the above terms in the present invention according to specific situations.

In addition, terms "include/comprise" or any other variations thereof are intended to cover non-exclusive inclusions, so that a process, an article, or a device/apparatus including a series of elements not only includes those elements, but also includes other elements that are not explicitly listed, or also includes inherent elements of the process, the article or the device/apparatus.

Hereto, the technical solutions of the present invention have been described in conjunction with the embodiments and drawings. Those skilled in the art, however, should easily understand that the scope of protection of the present invention is apparently not limited to these specific embodiments. Those skilled in the art may make equivalent changes or substitutions to the relevant technical features without departing from the principles of the present invention, and the technical solutions derived by making these changes or substitutions shall fall within the scope of protection of the present invention.

What is claimed is:

1. An experimental system for simulating an effect of a fault stick-slip displacement on a tunnel engineering, comprising a model box system and a stick-slip loading system; wherein the model box system is configured to simulate an interaction between two walls of a fault;

the stick-slip loading system comprises a first loading assembly, a second loading assembly and a bearing assembly; wherein
the first loading assembly comprises a first loading device and a first sample frame arranged at a preset position of the first loading device; wherein
the first sample frame is configured to place a main loading rock mass sample;
the bearing assembly is arranged on two sides of the first sample frame;
sub-loading rock mass samples borne by the bearing assembly are configured to abut against the main loading rock mass sample under an action of the second loading assembly;
the bearing assembly comprises a first bearing device and a second bearing device, wherein
the first bearing device and the second bearing device are arranged on the two sides of the first sample frame, respectively;
the sub-loading rock mass samples comprise a first sub-loading rock mass sample and a second sub-loading rock mass sample, wherein
the first sub-loading rock mass sample and the second sub-loading rock mass sample are placed in the first bearing device and the second bearing device, respectively;
the second loading assembly comprises a first horizontal loading device and a second horizontal loading device, wherein
the first horizontal loading device and the second horizontal loading device are arranged oppositely;
the first sub-loading rock mass sample and the second sub-loading rock mass sample clamp the main loading rock mass sample under an action of the first horizontal loading device and an action of the second horizontal loading device, respectively;
during an experiment, the second loading assembly provides a horizontal loading force for the main loading rock mass sample through the sub-loading rock mass samples; the first loading device pushes the first sample frame of the main loading rock mass sample, and the main loading rock mass sample rubs against the sub-loading rock mass samples to produce a stick-slip effect; the main loading rock mass sample is configured to provide a vertical loading force for a first wall of the two walls under an action of the first loading device to simulate a first seismic source for a reverse fault displacement; alternatively, the main loading rock mass sample is configured to provide a vertical loading force for a second wall of the two walls under the action of the first loading device to simulate a second seismic source for a normal fault displacement; alternatively, the main loading rock mass sample is configured to provide a horizontal loading force for the first wall under the action of the first loading device to simulate a third seismic source for a strike-slip fault displacement;
the model box system comprises an open and hollow box structure; the open and hollow box structure comprises a first box and a second box, wherein
the first box and the second box are arranged horizontally;
the first box comprises a first front panel, a first rear panel, a first side panel and a first bottom panel;
the second box comprises a second front panel, a second rear panel, a second side panel and a second bottom panel;
the first side panel and the second side panel are arranged oppositely;
an oblique contact surface is formed between the first box and the second box;
the first box and the second box are arranged horizontally on the left and right;
the first wall is arranged between a side of the second box and an inner surface of the first box, wherein the side of the second box is away from the second side panel; and
the second wall is arranged between a first side of the first box and an inner surface of the second box, wherein the first side of the first box is away from the first side panel.

2. The experimental system according to claim 1, wherein the stick-slip loading system is arranged under the first box;
the second box is fixed on the ground by a supporting device;
the first wall is a hanging wall, and the second wall is a foot wall;
the first sample frame is arranged on a top of the first loading device; a guide rail device is arranged on a top of the first sample frame; an extending direction of the guide rail device is identical to a moving direction of the second loading assembly; a groove structure adapted to the guide rail device is formed on a bottom of the first bottom panel.

3. The experimental system according to claim 1, wherein the stick-slip loading system is arranged under the second box;
the first box is fixed on the ground by a supporting device;
the first wall is a hanging wall, and the second wall is a foot wall;
the first sample frame is arranged on a top of the first loading device; a guide rail device is arranged on a top of the first sample frame; an extending direction of the guide rail device is identical to a moving direction of the second loading assembly; a groove structure adapted to the guide rail device is formed on a bottom of the second bottom panel.

4. The experimental system according to claim 1, wherein the stick-slip loading system is arranged on a second side of the first box, and the stick-slip loading system and the first box are arranged horizontally;
the second box is fixed on the ground;
the first wall and the second wall are two walls of a strike-slip fault, respectively;
the first sample frame is arranged on a side of the first loading device; a guide rail device is arranged on a side of the first sample, wherein the side of the first sample is frame away from the first loading device; an extending direction of the guide rail device is identical to a moving direction of the second loading assembly; a groove structure adapted to the guide rail device is formed on a side of the first front panel.

5. The experimental system according to claim 1, wherein the stick-slip loading system further comprises a first loading plate and a second loading plate; the first loading plate and the second loading plate are arranged on a movable end of the first horizontal loading device and a movable end of the second horizontal loading device, respectively;
a size of the first loading plate and a size of the second loading plate are adapted to a side area of the first sub-loading rock mass sample and a side area of the second sub-loading rock mass sample, respectively;
a roller assembly is arranged on a bottom of the first bottom panel;

the roller assembly comprises a plurality of rollers, and the plurality of rollers are arranged in an array.

6. The experimental system according to claim 1, wherein a thickness of the main loading rock mass sample is greater than a width of the first sample frame;
   a thickness of the first sub-loading rock mass sample is greater than a width of the first bearing device; and
   a thickness of the second sub-loading rock mass sample is greater than a width of the second bearing device.

7. The experimental system according to claim 1, wherein the stick-slip loading system further comprises a loading system frame;
   the loading system frame comprises a first side plate, a second side plate, a third side plate and a bottom plate;
   the first side plate and the second side plate are configured to fix the first horizontal loading device and the second horizontal loading device, respectively;
   each of the first side plate and the second side plate is an inverted L-shaped steel plate, and a short edge of the inverted L-shaped steel plate abuts against the model box system.

8. An experimental method for simulating an effect of a fault stick-slip displacement on a tunnel engineering based on the experimental system for simulating the effect of the fault stick-slip displacement on the tunnel engineering according to claim 1, comprising the following steps:
   step S100: placing the main loading rock mass sample and the sub-loading rock mass samples into the first sample frame and the bearing assembly, respectively; adjusting positions of the main loading rock mass sample and the sub-loading rock mass samples to enable the sub-loading rock mass samples to tightly contact the main loading rock mass sample; adjusting the second loading assembly to apply a preset pressure to the sub-loading rock mass samples, wherein a contact surface between each of the sub-loading rock mass samples and the main loading rock mass sample is a rock mass discontinuity;
   step S200: assembling the model box system based on the stick-slip loading system; wherein when the normal fault displacement or the reverse fault displacement is simulated, the model box system is arranged above the stick-slip loading system; the stick-slip loading system provides a vertical loading force for the model box system to displace, and the stick-slip loading system is fixed on the ground; when the strike-slip fault displacement is simulated, the model box system and the stick-slip loading system are placed horizontally back and forth; the stick-slip loading system is fixed on the ground; the first box in the model box system is moved by pulleys on a bottom of the first box, and the second box is fixed on the ground;
   step S300: according to experimental requirements, preparing a model of a tunnel structure and a model of a lining inside the tunnel structure, and arranging a detection device; selecting a similar material with a preset ratio to simulate a surrounding rock; layering the similar material in a model box, and placing the model of the tunnel structure at a half-height position;
   step S400: pushing the first sample frame of the main loading rock mass sample by the first loading device to enable the main loading rock mass sample to rub against the sub-loading rock mass samples to produce the stick-slip effect, wherein the first sample frame is in contact with the movable box in the model box system, and the stick-slip effect is transmitted to the movable box; the movable box moves along a preset inclined plane under a limitation of a preset linear slide rail to enable a rock and soil in the model box to displace, and the effect of the fault stick-slip displacement on the tunnel structure is simulated; during the experiment, a deformation of the rock and soil is observed in real time through a transparent box, and experimental data is acquired through an arranged monitoring sensor; and
   step S500: stopping the first loading device when a preset displacement is reached; removing the similar material to take out the tunnel model; resetting the first loading device, and releasing the second loading device; taking out the main loading rock mass sample and the sub-loading rock mass samples, and finishing the experiment.

9. The experimental method according to claim 8, wherein the stick-slip loading system is arranged under the first box;
   the second box is fixed on the ground by a supporting device;
   the first wall is a hanging wall, and the second wall is a foot wall;
   the first sample frame is arranged on a top of the first loading device; a guide rail device is arranged on a top of the first sample frame; an extending direction of the guide rail device is identical to a moving direction of the second loading assembly; a groove structure adapted to the guide rail device is formed on a bottom of the first bottom panel.

10. The experimental method according to claim 8, wherein the stick-slip loading system is arranged under the second box;
    the first box is fixed on the ground by a supporting device;
    the first wall is a hanging wall, and the second wall is a foot wall;
    the first sample frame is arranged on a top of the first loading device; a guide rail device is arranged on a top of the first sample frame; an extending direction of the guide rail device is identical to a moving direction of the second loading assembly; a groove structure adapted to the guide rail device is formed on a bottom of the second bottom panel.

11. The experimental method according to claim 8, wherein the stick-slip loading system is arranged on a second side of the first box, and the stick-slip loading system and the first box are arranged horizontally;
    the second box is fixed on the ground;
    the first wall and the second wall are two walls of a strike-slip fault, respectively;
    the first sample frame is arranged on a side of the first loading device; a guide rail device is arranged on a side of the first sample, wherein the side of the first sample is frame away from the first loading device; an extending direction of the guide rail device is identical to a moving direction of the second loading assembly; a groove structure adapted to the guide rail device is formed on a side of the first front panel.

12. The experimental method according to claim 8, wherein the stick-slip loading system further comprises a first loading plate and a second loading plate; the first loading plate and the second loading plate are arranged on a movable end of the first horizontal loading device and a movable end of the second horizontal loading device, respectively;
    a size of the first loading plate and a size of the second loading plate are adapted to a side area of the first sub-loading rock mass sample and a side area of the second sub-loading rock mass sample, respectively;

a roller assembly is arranged on a bottom of the first bottom panel;

the roller assembly comprises a plurality of rollers, and the plurality of rollers are arranged in an array.

13. The experimental method according to claim 8, wherein a thickness of the main loading rock mass sample is greater than a width of the first sample frame;

a thickness of the first sub-loading rock mass sample is greater than a width of the first bearing device; and a thickness of the second sub-loading rock mass sample is greater than a width of the second bearing device.

14. The experimental method according to claim 8, wherein the stick-slip loading system further comprises a loading system frame;

the loading system frame comprises a first side plate, a second side plate, a third side plate and a bottom plate;

the first side plate and the second side plate are configured to fix the first horizontal loading device and the second horizontal loading device, respectively;

each of the first side plate and the second side plate is an inverted L-shaped steel plate, and a short edge of the inverted L-shaped steel plate abuts against the model box system.

\* \* \* \* \*